(12) United States Patent
De Angelis et al.

(10) Patent No.: US 8,857,219 B2
(45) Date of Patent: Oct. 14, 2014

(54) APPARATUS FOR USE IN DIRECT RESISTANCE HEATING OF PLATINUM-CONTAINING VESSELS

(75) Inventors: Gilbert De Angelis, Lindley, NY (US); Muluwork Geremew, Columbia, MD (US); Juan Camilo Isaza, Corning, NY (US); James Patrick Murphy, Corning, NY (US)

(73) Assignee: Corning Incorporated, Corning, NY (US)

( * ) Notice: Subject to any disclaimer, the term of this patent is extended or adjusted under 35 U.S.C. 154(b) by 106 days.

(21) Appl. No.: 13/546,461

(22) Filed: Jul. 11, 2012

(65) Prior Publication Data

US 2014/0013806 A1  Jan. 16, 2014

(51) Int. Cl.
C03B 7/07 (2006.01)
C03B 7/098 (2006.01)
H05B 3/40 (2006.01)
H05B 3/60 (2006.01)
H05B 1/00 (2006.01)
C03B 7/06 (2006.01)
C03B 5/167 (2006.01)
H05B 3/00 (2006.01)

(52) U.S. Cl.
CPC . C03B 7/098 (2013.01); C03B 7/06 (2013.01); H05B 1/00 (2013.01); C03B 5/1675 (2013.01); H05B 3/0004 (2013.01)
USPC .......................................................... 65/355

(58) Field of Classification Search
CPC ............ C03B 7/098; C03B 7/07; H05B 1/00; H05B 1/0244; H05B 1/0291; H05B 3/40; H05B 7/06; H05B 2203/012; H05B 2203/025; H05B 3/0009; H05B 3/60

USPC .................................................. 65/135.1, 355
See application file for complete search history.

(56) References Cited

U.S. PATENT DOCUMENTS 4,397,665 A  8/1983  Harris ............................. 65/12
6,076,375 A  6/2000  Dembicki et al. ............. 65/326
(Continued)

FOREIGN PATENT DOCUMENTS

DE  19948634  2/2005
EP  1 857 420  11/2007
(Continued)

OTHER PUBLICATIONS

PCT/US2013/050033 International Search Report.

(Continued)

*Primary Examiner* — Matthew Daniels
*Assistant Examiner* — Cynthia Szewczyk
(74) *Attorney, Agent, or Firm* — Kevin M. Able

(57) ABSTRACT

An apparatus for use in controlling a temperature of an oblong-shaped molten glass-carrying vessel, such as a conduit for transporting the molten glass from one location to another location, by flowing a current through the vessel. The apparatus comprises a metal flange comprising a plurality of electrically-conductive rings that include an inner ring joined to the vessel's exterior wall and an outer ring surrounding the inner ring. The inner ring, for example, may include an outer perimeter that is substantially oblong. In some embodiments the inner ring comprises a notch that aids in making current density more uniform. In some examples the width of the inner ring, excluding the notch, does not substantially vary as a function of angular position relative to the vessel.

13 Claims, 6 Drawing Sheets

(56) References Cited

U.S. PATENT DOCUMENTS

| | | |
|---|---|---|
| 7,013,677 B2 | 3/2006 | Singer .......................... 665/327 |
| 8,269,131 B2 | 9/2012 | Adelsberg et al. ........... 219/59.1 |
| 8,274,018 B2 | 9/2012 | De Angelis et al. .......... 219/420 |
| 2007/0084247 A1* | 4/2007 | Pitbladdo ....................... 65/346 |
| 2008/0050609 A1 | 2/2008 | Abe et al. ...................... 428/592 |
| 2008/0083250 A1 | 4/2008 | Nagno et al. .................... 65/355 |
| 2008/0087046 A1 | 4/2008 | Hirabara et al. ................. 65/355 |
| 2008/0092597 A1 | 4/2008 | Otoh et al. ...................... 65/355 |
| 2012/0125051 A1 | 5/2012 | Bergman et al. ................ 65/128 |

FOREIGN PATENT DOCUMENTS

| | | | |
|---|---|---|---|
| JP | 2009-298671 | 12/2009 | |
| WO | WO2009108314 | 9/2009 | ............... C03B 5/16 |

OTHER PUBLICATIONS

ASM Handbook, vol. 2, "Properties and Selection: Nonferrous Alloys and Special-Purpose Materials", 1990, p. 713.

O. Kubaschewski and B.E. Hopkins, "Oxidation of Metals and Alloys", Academic Press, 1962, pp. 91, 108, 119, 144, 243.

H. Luo and P. Duwez, "Solid Solutions of rhodium with copper and nickel", J. Less Common Metals, 1964, vol. 6, pp. 248-249.

Y. Terada, K. Ohkubo, and T. Mohri, "Thermal Conductivities of Platinum Alloys at High Temperatures", Platinum Metals Review, 2005, vol. 49, pp. 21-26.

D. E. Thomas, "Discussion—On the Mechanism of Oxidation of Nickel-Platinum Alloys", J. Inst. Metals (1949), vol. 76, pp. 738-741.

C. Wagner, "Theoretical Analysis of the Diffusion Processes Determining the Oxidation Rate of Alloys", J. Electrochem Soc., vol. 99, (1952) pp. 369-380.

* cited by examiner

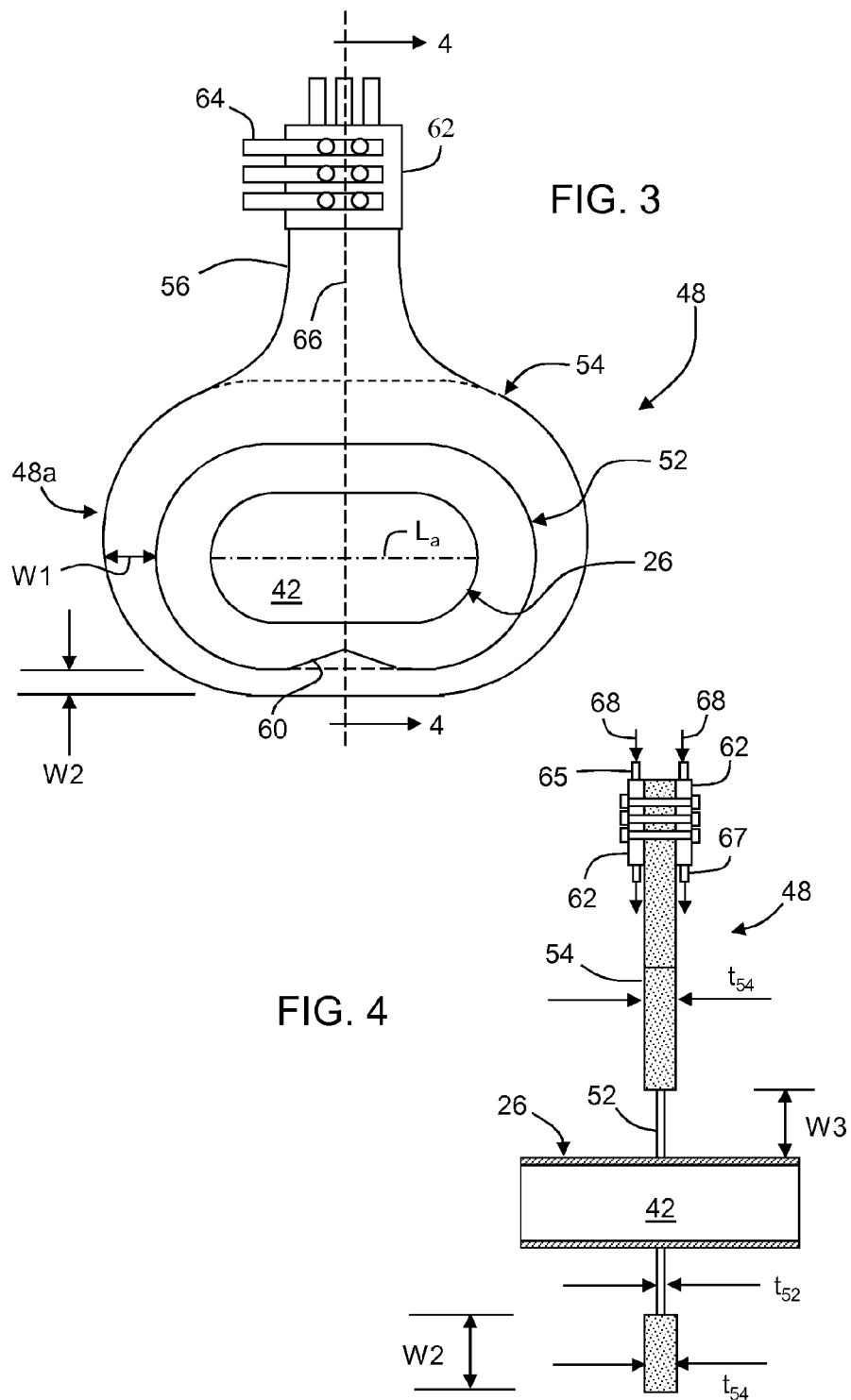

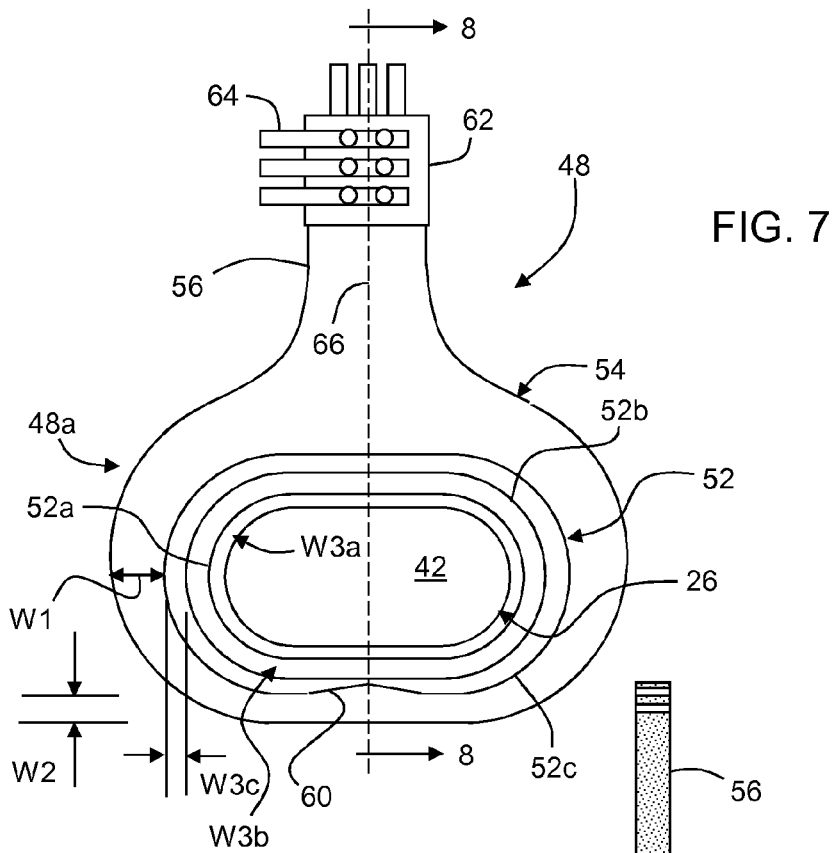
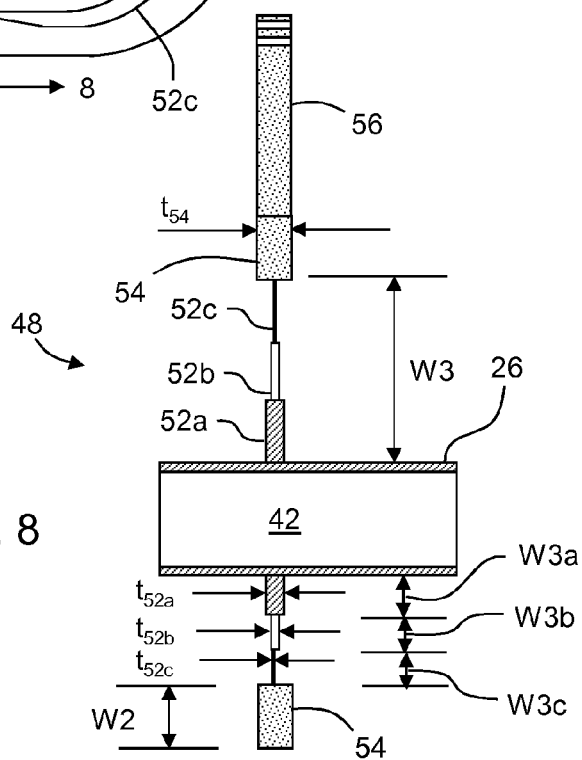
FIG. 7
FIG. 8

APPARATUS FOR USE IN DIRECT RESISTANCE HEATING OF PLATINUM-CONTAINING VESSELS

FIELD

This invention relates to glass making and in particular to the direct resistance heating of platinum-containing vessels used to hold or transport molten glass, e.g., vessels such as melters, finers, stir chambers, formers, connecting tubes, and the like.

BACKGROUND

The basic steps in the manufacture of sheet glass, e.g., sheet glass for use as substrates for electronic displays, such as liquid crystal displays (LCDs), include: (1) melting raw materials, (2) fining (refining) the melt to remove gaseous inclusions, (3) stirring the fined molten glass to achieve chemical and thermal homogeneity, (4) thermally conditioning the homogenized glass to reduce its temperature and thus increase its viscosity, (5) forming the cooled molten glass into a glass ribbon, and (6) separating individual glass sheets from the glass ribbon. In the case of a downdraw fusion process, the glass ribbon is formed using a forming body known as an "isopipe," while in a float process, a molten tin bath is used for this purpose. Other methods as are known in the glass making arts may also be used.

High temperatures are needed to successfully fine molten glass since the rate of rise of gaseous bubbles through molten glass varies inversely with the viscosity of the glass. That is, the lower the viscosity, the faster the rate of rise. Glass viscosity varies inversely with temperature, accordingly, the higher the temperature, the lower the viscosity. Because molten glass is in the apparatus used for fining for only a limited amount of time, achieving a rapid rise of bubbles through the melt is of great importance. Hence, the finer is normally operated at as high a temperature as possible and therefore the molten glass is at a low viscosity. However, to form molten glass into a ribbon requires viscosities much higher than those used during fining. Hence, the need to thermally condition (cool) the molten glass between fining and forming.

Historically, thermal conditioning has been performed by passing the molten glass through a conduit having a circular cross-section. The conduit has been surrounded by ceramic material and supported by a metal frame, and the rate of heat loss from the molten glass has been controlled through the use of direct or indirect heating so as to avoid introducing substantial thermal and flow inhomogeneities into the glass as a result of the cooling process. Because of the high temperature of the molten glass and the need to avoid contamination of the molten glass, the wall of the conduit is often formed from a precious metal, for example, a platinum group metal.

Among the valuable characteristics of platinum-containing materials is their ability to generate heat when conducting electricity. As a result, molten glass flowing through, or held in, a platinum-containing vessel can be heated by passing electrical current between one or more locations along the length of the vessel's glass-contacting wall. Such heating is known in the art as "direct heating" or "direct resistance heating," the term used herein. In this usage, "direct" denotes heating from the vessel itself, rather than through externally applied indirect resistance or flame heating.

A major challenge in direct resistance heating is the introduction and removal of the electric current from the vessel's wall. This is not only an electrical problem, but is also a thermal problem since the conduction path can lead to unbalanced current densities that create hot spots in the conduction path. These hot spots can lead to premature material failure, such as through accelerated oxidation of the metals involved or by reaching the melting point of the metal.

One way of introducing current into a vessel's wall is through the use of an electrically-conductive metal flange. Examples of such flanges can be found, for example, in U.S. Pat. Nos. 6,076,375 and 7,013,677. The present invention is concerned with flanges used to introduce current into a platinum-containing vessel wall and, in particular, ensuring a uniform current density within the flange and the vessel carrying the molten glass.

SUMMARY

To improve the uniformity of the current density flowing through a flange designed to deliver electric current to a metal vessel for the purpose of heating a molten material flowing through the vessel, methods and apparatus are disclosed that provide for an angularly asymmetric mass distribution about the vessel.

In one aspect an apparatus for conveying a molten material is disclosed comprising: a vessel having an electrically conductive exterior wall portion, wherein a cross section of the vessel has a long axis La and a short axis Sa; a metal flange joined to the vessel about a perimeter of the vessel, the flange comprising a plurality of rings including a platinum-containing inner ring and an outermost ring surrounding the platinum-containing ring, and wherein the outermost ring surrounding the platinum-containing ring comprises a body portion and an electrode portion extending therefrom; and wherein a width of the body portion of the outermost ring along the long axis La of the vessel is different than a width of the body portion of the outermost ring along the short axis Sa of the vessel and wherein the platinum-containing ring comprises a notch. The outermost ring may, for example, comprise nickel. The metal flange may comprise a single axis of symmetry parallel with one of the short axis Sa or the long axis La.

In some examples, a width of the platinum-containing ring, excluding the notch, does not substantially vary. The platinum-containing ring may comprise a plurality of platinum-containing rings, and a thickness of at least one of the plurality of platinum-containing rings is different that a thickness of another of the platinum-containing rings. In some embodiments the platinum-containing ring comprises a plurality of platinum-containing rings, and an outermost platinum-containing ring of the plurality of platinum-containing rings comprises the notch. In some embodiments the body portion of the outermost ring does not include a cooling member configured to carry a cooling fluid within a passage of the cooling member.

In another aspect an apparatus for forming a glass sheet is described comprising: a vessel having an electrically conductive exterior wall portion with an oblong cross sectional shape; a metal flange comprising a plurality of rings including at least: a first ring having a first composition comprising platinum and joined to the vessel about a perimeter of the vessel, the first ring having an outer perimeter with an oblong cross sectional shape; and a second ring having a second composition different from the first composition and comprising a body portion and an electrode portion extending therefrom; and wherein a width of the second ring varies as a function of angular position relative to the vessel.

The apparatus may further comprise a forming body comprising converging forming surfaces. In some examples the first ring comprises a notch. In some embodiments a width of the first ring does not substantially vary. The first ring, for example, may comprise a plurality of platinum-comprising rings, and a thickness of at least one of the plurality of platinum-comprising rings is different that a thickness of another of the plurality of platinum-comprising rings. In some embodiments the first ring comprises a plurality of platinum-comprising rings, and an outermost platinum-comprising ring of the plurality of platinum-comprising rings comprises a notch. The body portion of the outermost ring in some embodiments does not include a cooling member configured to carry a cooling fluid within a passage of the cooling member.

In still another aspect an electrical flange for heating a molten material is disclosed comprising: a plurality of metal rings including at least: a first ring having a first composition comprising platinum and having an outer perimeter with an oblong shape; and a second ring having a second composition different from the first composition and comprising a body portion and an electrode portion extending therefrom; and wherein a width of the body portion varies as a function of angular position relative to the vessel. In some examples the first ring comprises a notch. The first ring may comprise a plurality of platinum-containing rings, and an outermost platinum-containing ring of the plurality of platinum-containing rings comprises the notch. A width of at least one of the first or second rings may very as a function of angular position relative to the vessel.

In yet another aspect a method of making a glass sheet is described comprising: melting a batch material to form a molten glass; flowing the molten glass through a metallic vessel comprising platinum, the metallic vessel having an oblong perimeter shape; supplying an electric current to a first electrically conducting flange, wherein the vessel extends through and is in contact with the first electrically conducting flange along the perimeter of the vessel, the electrically conducting flange comprising: a plurality of rings including a platinum-containing inner ring and an outermost ring surrounding the platinum-containing ring, and wherein the outermost ring surrounding the platinum-containing ring comprises a body portion and an electrode portion extending therefrom; and wherein a width of the body portion of the outermost ring along the long axis La of the vessel is different than a width of the body portion of the outermost ring along the short axis Sa of the vessel and wherein the platinum-containing ring comprises a notch.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 3 is a front view of an example flange assembly of FIG. 2B;

FIG. 4 is a cross sectional side view of the flange assembly of FIG. 3;

FIG. 7 is a front view of another example flange assembly according to embodiments of the present disclosure;

FIG. 8 is a cross sectional side view of the flange assembly of FIG. 7;

DETAILED DESCRIPTION

Figure 1:
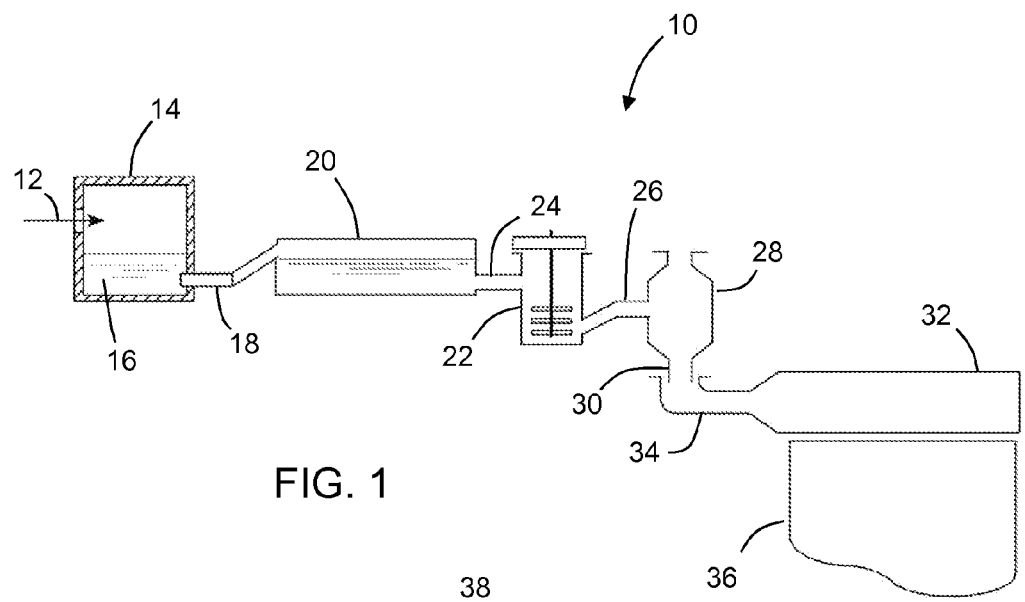
FIG. 1 is a schematic diagram of an exemplary fusion down draw process for manufacturing glass sheet.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used herein and in the claims, the term "precious metal" means a platinum group metal or alloys thereof. Of particular interest, platinum, grain-stabilized platinum, a platinum alloy, or a grain-stabilized platinum alloy in included, without limitation to other platinum-group metals. As a non-limiting example, the term includes a platinum-rhodium alloy such as an alloy of 80 wt. % platinum and 20 wt. % rhodium.

As used herein and in the claims, the term "oblong cross-section" means a cross-section that has the shape of an ellipse, an oval, or a racetrack (i.e., the perimeter of the cross-section has parallel straight sides which are connected at each end by a curve, e.g., a hemisphere, or by a straight section with a curve at each end, e.g., a quarter of a circle at each end). An "oblong conduit" is a conduit having an oblong cross-section perpendicular to a lengthy of the conduit. An oblong conduit comprises a long cross sectional axis and a short cross sectional axis, wherein the long cross sectional axis bisects the conduit along the longest dimension of the conduit cross-section and the short cross sectional axis bisects the conduit along the shortest cross-section.

In the exemplary apparatus 10 of FIG. 1, batch materials, represented by arrow 12 are fed into a furnace or melter 14 and melted to form molten glass 16 at a first temperature $T_1$. $T_1$ is dependent on the particular glass composition, but for LCD-capable glasses as a non-limiting example, $T_1$ can be in excess of 1500° C. The molten glass flows from melter 14 through connecting conduit 18 to finer conduit (or "finer") 20. From finer 20 the glass flows to stirring vessel 22 through connecting conduit 24 to be mixed and homogenized, and from stirring vessel 22 through connecting conduit 26 to delivery vessel 28 and thereafter to downcomer 30. The molten glass can then be directed to forming body 32 through inlet 34. In the case of the fusion downdraw process depicted in FIG. 1, the molten glass delivered to forming body 32 flows over converging forming surfaces of forming body 32, where the separate flows are joined together, or fused, to form ribbon of glass 36. The ribbon may then be cooled and separated to form individual glass sheets.

At finer 20 the molten glass is heated to a second temperature $T_2$ higher than $T_1$. For example, whereas $T_1$ may be 1500° C. as an example, $T_2$ can be at least 100° C. greater than $T_1$. The relatively high temperature in $T_2$ reduces the viscosity of the molten glass, thereby allowing bubbles in the molten material to more easily be eliminated. Moreover, the higher temperature releases oxygen contained in fining agents (e.g., multivalent oxide materials included in the molten glass) that entered the molten glass through the batch materials. The released oxygen forms bubbles in the molten glass that serve essentially as nucleating sites. To wit, dissolved gasses in the molten glass migrate into the oxygen bubbles, growing the bubbles. The increased buoyancy resulting from the bubble growth speeds removal of the bubbles from the molten glass through a free surface thereof.

While melter 14 is typically formed from a refractory material (e.g. ceramic bricks), much of the downstream system, including various vessels for conveying the molten glass, such as connecting conduits 18, 24, 26, finer 20, stirring vessel 22, delivery vessel 28, downcomer 30 and inlet 34 are all typically formed from an electrically conducting precious metal, usually platinum or a platinum alloy such as a platinum rhodium alloy. As described above, the molten glass is quite hot, and therefore a high temperature metal capable of withstanding temperatures in excess of at least 1600° C. for prolonged periods is needed. Moreover, the metal should be resistant to oxidation, or shielded to reduce contact with oxygen, which oxidation can be accelerated by the high temperatures experienced by the precious metal components. In addition, the molten glass is fairly corrosive, so the precious metal should be relatively resistant to attack from the glass that can result in contamination of the glass by the vessel material. Metals comprising the periodic table platinum group (platinum, rhodium, iridium, palladium, ruthenium and osmium) are particularly useful for this purpose, and because platinum is more easily worked than other platinum group metals, many high temperature processes utilize platinum or platinum alloy vessels. However, because platinum is expensive, every effort is made to minimize the size of these vessels.

Figure 2A:
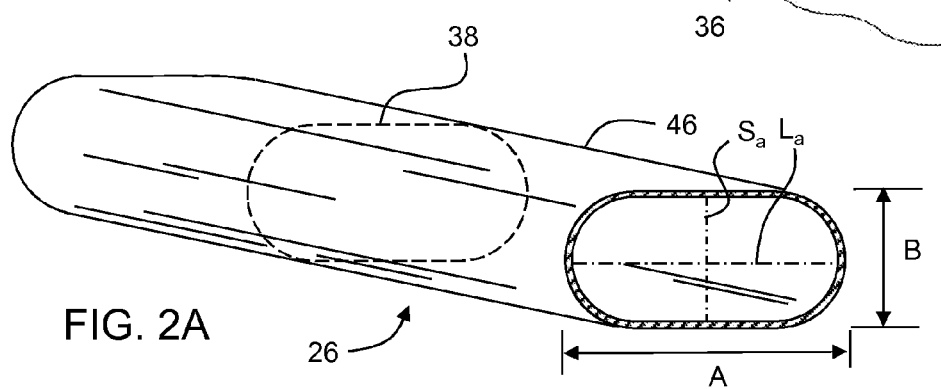
FIG. 2A is a perspective view of a conduit for carrying molten glass.
Figure 2B:
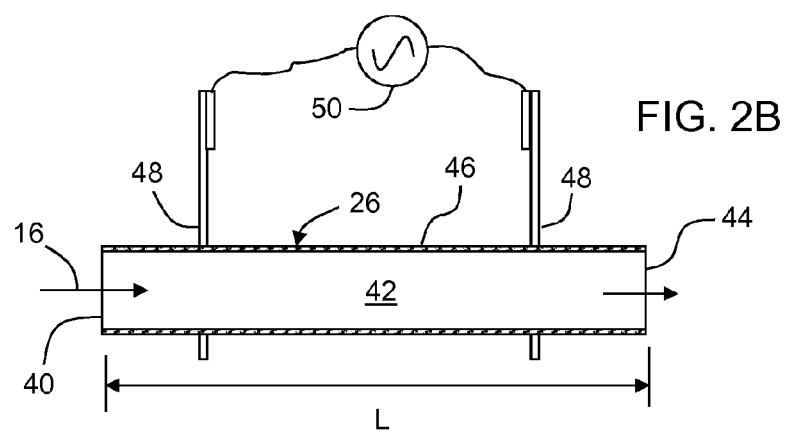
FIG. 2B is a cross sectional side view of the conduit of FIG. 2A comprising flange assemblies in accordance with embodiments of the present disclosure for delivering an electric current to the conduit.

FIG. 2A is a perspective view of an embodiment of a connecting conduit, such as connecting conduit 26, having an oblong cross-section as represented by dashed line 38, and specifically in the case of FIG. 2A, a "racetrack" cross sectional shape. By racetrack what is mean is a shape having two circular sections at the ends of the long dimension connected by two straight sections. During use, molten glass 16 enters the conduit through its entrance end 40, travels along interior passage 42 and exits through its exit end 44 as shown in FIG. 2B.

In practice, the conduit can have a variety of dimensions. For example, a length L of the conduit can be on the order of feet, for example 3-12 feet (~3.7 meters) and the conduit can have a width A along the oblong conduit's long axis $L_a$ on the order of 15-30 inches (~76 centimeters) and a height B along the oblong vessel's short axis Sa of 6-9 inches (~23 centimeters). Width A and height B represent the nominal outside dimensions of the conduit. To facilitate construction, the conduit can be assembled from a plurality of oblong segments, e.g., segments that each has a length of 1 foot (~0.3 meters). It should be noted, however, that the foregoing dimensions are examples only, and specific dimensions will depend on the system in which the conduit is installed, including volume and flow requirements for the molten glass.

The width to height ratio (A/B ratio) of the oblong conduit may be set in the range of 2 to 6. This range also results in low head losses for the molten glass as it passes through the conduit. Importantly, for an equivalent heat transfer rate and equivalent temperature and flow gradients, a conduit having a circular cross section would need to be 2.5 times longer than an oblong conduit having an A/B ratio of 3.3. In addition, such a circular conduit would have a head loss 16 times greater than the oblong conduit. As known to skilled workers, length is important in managing thermal expansion of precious metal systems and in minimizing building floor space. Also, head loss is an important variable in maintaining uniform glass flow, which is relevant to virtually all forming methods and particularly relevant for the downdraw fusion forming process.

In accordance with an exemplary embodiment, the oblong conduit is at least 3 meters long and, when performing thermal conditioning such as controlled cooling of the molten glass, is filled with molten glass that (1) flows at a rate of at least 800 kilograms/hour (~1800 lbs/hour) and (2) cools at an average rate of at least 30° C. per meter between the conduit's entrance and exit faces. By applying more heat to the wall of the conduit along the length of the conduit's long cross sectional axis than along the length of its short cross sectional axis, the calculated temperature difference of the molten glass at the exit face between (a) the center of the conduit and (b) the intersection of the conduit's short axis with the conduit's wall can be made less than or equal to about 15° C., assuming a uniform temperature distribution at the entrance face.

In an unheated transfer between a first vessel and a second vessel through a precious metal connecting conduit (that is, where heat energy is not added to the molten glass material), the molten glass begins immediately to cool upon entering the connecting conduit. However, it is desirable to control the rate at which the molten glass cools so the molten glass does not cool below a predetermined minimum temperature at specific points along the flow path. Thus, the connecting conduits are preferably heated to compensate for excessive heat loss. In some cases, such as in the case of the connecting conduit between the melter and the finer, the temperature of the molten glass flowing to the finer is increased before the glass enters the finer by supplying more heat energy to the conduit than the conduit losses through conduction and convection. This heating is usually accomplished by a direct heating method as summarized earlier, although external heat sources can be used. If the flow of molten glass is increased over an initial flow, the heating requirements are increased for a predetermined temperature. This may require, for example, increasing the length of the connecting conduit to allow more time for heating and ensure the molten glass is at the proper temperature. Process costs may increase as a result, as the amount of platinum used in forming the longer conduit increases. Moreover, in a typical manufacturing environment the availability of additional floor space is often limited, rendering the option of lengthening components problematic, regardless of material costs.

An alternative approach is to increase the heat energy supplied to the connecting conduit. For a direct heated connecting conduit this means increasing the electrical current flow through the directly heated component. The current can be an alternating current (AC) or a direct current (DC), but is often an AC current. However, the increased current flow has been found to create hot spots both at the point where the electrical flange assembly that feeds electric current to the vessel meets the vessel wall and within the flange assembly itself. Hot spots at the location where the flange assembly and the conduit meet can lead to uneven heating of the molten glass, and hot spots within the flange assembly can compromise the integrity of the flange assembly, such as by inducing accelerated oxidation or melting, and premature failure of the flange assembly. Moreover, although electrical flange assemblies may be actively cooled to prevent premature failure, failure of the cooling system can be catastrophic if the un-cooled temperature of the flange exceeds a certain threshold for the material used.

One cause of hot spots in a flange assembly results from the high current density in the flange assembly at a location on a line with the electrode that connects the flange assembly to the electrical current source. That is, flange assemblies typically include a tab or electrode that extends from the flange body and connects to cables or bus bars that feed current to the flange assembly. As a result, the electric current density near the location where the electrode joins with the flange body is typically much higher than other locations on the flange assembly. If the current supplied to the flange assembly is increased to address greater heating demands, the higher current density in the flange body in the region near the electrode (where the current is distributed to the flange body from the electrode) can create a temperature great enough in the flange body to cause premature failure of the flange body through rapid oxidation of the materials comprising the flange body. Or, in extreme cases, the current flow may be sufficient to heat and melt the electrode and/or flange body.

FIG. 2B illustrates a portion of a direct resistance heating system and depicts an exemplary metal vessel (e.g. conduit), here stirring vessel to delivery vessel connecting conduit 26, having an exterior wall 46 to which are attached two flange assemblies 48 that apply electric current to exterior wall 46. It should be noted that conduit 26 represents an exemplary use of direct heating, and flange assemblies 48 could be employed with any other electrically conducting metal vessels or conduits utilized to hold or convey molten glass.

Although only two flange assemblies are shown, in practice more than two flange assemblies can be used for any particular vessel or conduit to provide electric current to different sections of an exterior wall in which the flange assemblies are in electrical communication with. The central aperture of the flange body through which the vessel or conduit extends will have a shape complimentary to the cross sectional shape of the vessel or conduit, i.e. the shape of the vessel or conduit perimeter.

In accordance with FIG. 2B, first and second flange assemblies 48 are connected to power supply 50, wherein a current flows between the flange assemblies and through the vessel (e.g. conduit). The current travels through the first flange assembly, enters the vessel wall, and is withdrawn through the second flange assembly spaced apart from the first flange assembly. The distance between the flange assemblies is determined by the heating requirements placed on the vessel, and is easily determined by one of ordinary skill in the art. The electric current traveling through exterior wall 46 of the vessel heats the vessel and the molten glass conveyed within. Although not shown in FIG. 2B, during use the vessel's wall and at least portions of the flange assemblies will normally be surrounded by thick layers of insulating refractory materials to control heat loss from the vessel or conduit.

FIG. 3 shows the construction of an embodiment of a single flange assembly 48 of FIG. 2 in more detail. As can be seen, flange assembly 48 includes a flange body portion 48a comprising two rings 52, 54, wherein the innermost ring 52 is formed from a high-temperature resistant metal (i.e., as used herein, a metal capable of operating at temperatures above at least 1400° C., preferably at least 1500° C. and more preferably at least 1600° C.) that comprises a platinum group metal. For example, innermost ring 52 may comprise at least 80 wt. % platinum, with the remainder, if any, being one or more of rhodium or iridium. As one example, innermost ring 52 can comprise 90 wt. % platinum and 10 wt. % rhodium.

Because the temperature of flange body portion 48a decreases as a function of increasing distance from the molten glass-conveying conduit, the temperature resistance required from the outermost ring material is not as high as that required from the innermost ring material. Thus, to save cost, outermost ring 54 may be formed of a material generally having a high melting temperature, but being considerably less expensive than the platinum containing material of inner ring 52.

In accordance with certain embodiments, outermost ring 54 of flange body portion 48a is formed from nickel. For example, outermost ring 54 may be formed from commercially pure nickel (e.g. at least 99.0 wt. % nickel), such as nickel 200 or nickel 201, which is readily available at low cost when compared to platinum and platinum alloys. When used in an electrical power flange assembly, nickel provides an excellent combination of electrical resistance, thermal conductivity, oxidation resistance, solubility with platinum and rhodium, machinability, price, and availability in many forms and shapes that other high temperature materials may have difficulty matching. Flange assembly 48 further comprises a neck portion, i.e. electrode 56, extending from ring 54 that connects flange body portion 48a to the busses leading to power supply 50.

In the embodiment of FIG. 3, flange assembly 48 comprises only a single electrode 56 such that the power connection is asymmetrical. As a consequence, current density around the innermost ring 52 may by non-uniform. Accordingly, flange body portion 48a may further comprise a notch 60 in innermost ring 52 that serves to increase the uniformity of the current density around innermost ring 52. As later embodiments will show however, such asymmetry is not required, and a notch may not be present.

As shown in FIG. 4 illustrating a cross sectional view of the flange assembly of FIG. 3, rings 52 and 54 have different thicknesses, $t_{52}$ and $t_{54}$, respectively. These thicknesses are chosen to control the current density as a function of radial position. That is, the thickness of the flange body varies as one moves in an outward direction away from conduit 26. A number of considerations come into play in selecting these thicknesses. First, as discussed above, the primary goal of direct resistance heating is to supply heat energy to the molten glass in the vessel or conduit, not to heat the flanges supplying electric current to the vessel's wall. Accordingly, the electric current density in the flange should be less than the current density in the vessel wall to minimize energy loss. Second, the electric current density should be controlled so that parts of the flange do not become overheated and thereby damaged. This is a particular problem for those portions of the flange assembly that experience higher ambient temperatures during use.

As a starting point for selecting ring thicknesses, it can be noted that a flange assembly constructed of a single material having a constant thickness will have a current density that increases linearly with decreasing distance from the conduit, i.e., the current density will be the smallest at the outer edge of the flange body and the greatest at the inner edge. To offset this effect, the thickness of the flange body should be increased as the distance from the wall of the conduit becomes smaller. In terms of temperature, the ambient temperature normally drops as one moves outward from conduit 26 and thus electric current density can be higher toward the outside of the flange where the chances of damage due to overheating are less. This leads to a flange body whose thickness becomes smaller as the distance from the wall of the conduit increases. A reduced thickness in the outer region of the flange farther from the conduit wall is also desirable to minimize the amount of material used to construct the flange assembly, especially in the case of expensive platinum-containing materials.

A further factor involves the resistivity of the material making up the flange assembly, especially where more than one type of material is being used. The higher the resistivity, the greater the direct heating effect for the same current density. Also, it can be desirable for the outermost ring of the flange body to have a substantial thickness so that the outermost ring has a low resistance to circumferential current flow. More particularly, in certain embodiments the variation in calculated current density (i.e., the modeled current density variation) around the perimeter of the outermost ring is less than 50%.

In addition to these electrical considerations, the effects of operating temperature on the nickel-containing components of the flange assembly also need to be considered. In general terms, suitable temperatures for the nickel-containing components of the flange assembly are: (1) less than about 600° C. in normal operation with water cooling of the flange assembly itself, (2) less than about 800° C. with air cooling, and (3) less than about 1000° C. un-cooled (passive cooling only). At about 600° C. and below, nickel has a sufficiently low oxidation rate so that flange assembly lifetimes of three years or more can be achieved. At about 1000° C., the usable lifetime is less than 30 days. The lifetime at about 800° C. is between these values, and may be acceptable for some applications, especially if exposing the nickel to these temperatures allows air cooling to be used, which can often be less complex than water cooling.

More generally, temperatures decrease in the refractory insulation as the distance from the wall of the conduit is increased. Temperatures likewise decrease with an increasing extent of the flange body in a direction away from the conduit (e.g. a larger diameter flange body). At some distance from the conduit wall the temperature of the flange body drops below a temperature of about 1000° C. Beyond this position, nickel can safely be used for the flange body material. If the nickel temperature limits, e.g., about 600° C. for long life, about 800° C. for intermediate life, or about 1000° C. for short periods of time, are exceeded under any condition, the joint between nickel and the high-temperature metal used in the inner part of the flange body portion 48a must be moved to a larger distance from the conduit wall. Outward movement of the joint, of course, should be balanced against increased material costs since the high-temperature, and thus, high cost metal must then extend to a larger radius.

In practice, computer modeling will typically be used to take into account the various factors involved in selecting the size of the flange body in a direction away from (perpendicular to) the conduit wall and the thicknesses of the rings making up the flange body. Such modeling can be performed using commercially available or customized software packages that calculate electric current flows for specified conductor properties and geometries, as well as packages that model heat flows and calculate temperature distributions for specified material properties and heat source/sink locations. For example, using such analyses a suitable relationship for the thicknesses (t's) of the rings of FIG. 4 was found to be: $t_{54} > t_{52}$ where inner ring 52 was made of 90 wt. % platinum and 10 wt. % rhodium, and outer ring 54 as well as electrode 56 were made of nickel 200/201. Other relationships can, of course, be used.

The rings and the electrode used to construct flange assembly 48 will typically be fabricated from flat metal sheets, e.g., nickel 200, nickel 201, nickel 600 or nickel 601, for electrode 56 and outer ring 54, and a platinum-rhodium alloy sheet (e.g., 90 wt. % platinum and 10 wt. % rhodium) for inner ring 52. The joints between the rings are typically welded. The welds can be filleted to avoid re-entrant corners which can produce a locally high current density that can cause a joint to overheat and fail. Innermost ring 52 is joined to exterior wall 46 of conduit 26, usually by welding. Again, filleting can be used to avoid re-entrant corners. The thickness of innermost ring 52 is typically greater than the thickness of exterior wall 46, although other thicknesses can be used for the innermost ring if desired, e.g., the thickness of the innermost ring can be equal to or smaller than the thickness of exterior wall 46.

In addition to rings 52 and 54, the flange assemblies of FIGS. 3 and 4 may include one or more cooling blocks 62. Cooling blocks 62 may be made of the same material as outer ring 54, although the cooling blocks can also be formed from a different material if the anticipated temperature constraints allow. In some embodiments, the junction between electrode 56 and a buss bar 64 that supplies current to the electrode may include cooling block 62 as illustrated in FIG. 4. FIG. 4 depicts electrode 56, buss bars 64 and cooling blocks 62, and shows inlet 65 and outlet 67 for supplying a cooling fluid 68 to passages within the interior of cooling blocks 62. The cooling fluid can be a liquid, e.g., water, or a gas, e.g., air, and may be circulated through a cooling channel in the block to keep the block (and the buss bar connection) at temperatures below those at which it will rapidly oxidize and/or melt. Substantial cooling may be required to prevent rapid oxidation of the buss components as the temperature of the molten glass in conduit 26 can be in excess of 1400° C. As an alternative, a cooling tube can be attached to an exterior of cooling blocks 62.

The use of nickel for the above components of an electrical power flange assembly has been found to exhibit a high level of oxidation resistance when operated at high temperatures. Nickel-containing flange assemblies may also require less cooling than, for example, copper-containing flange assemblies often used in lower temperature systems. Accordingly, in general, less direct resistance heating is needed when a nickel-containing flange is used. This reduction in direct resistance heating, in turn, reduces operational costs for electricity and capital costs in terms of the capacity of the electrical source needed to power the direct heating system.

In addition to these functional benefits, the use of one or more rings which comprise nickel significantly reduces the cost of the flange assembly since the nickel is used at locations where platinum or a platinum alloy might otherwise be used in a copper-containing flange assembly. That is, the lower temperature resistance of copper means a platinum-copper flange requires the platinum to extend farther out from the heated conduit to provide a safe operating environment for the copper. Although the prices of nickel and platinum vary over time, as a rule of thumb, platinum is at least 400 times more expensive than nickel and sometimes can be more than 1800 times more expensive.

As depicted in the embodiment of FIGS. 3 and 4, inner platinum-containing ring 52 is disposed about connecting conduit 26 and joined about a perimeter thereof. Inner platinum-containing ring 52 may have an outer perimeter that has substantially the same shape as the cross sectional shape 38 of conduit 26 passing through the ring. Thus, if the cross sectional shape of the conduit is oblong, the outer perimeter of the innermost ring 52 may also be oblong. For example, innermost ring 52 may have dimensions proportionally enlarged relative to the cross sectional dimensions of the conduit.

In accordance with FIG. 3, dashed line 66 represents an axis of symmetry passing through electrode 56 and bisecting flange assembly 48. In the embodiment of FIG. 3, axis of symmetry 66 coincides with short cross sectional axis Sa of conduit 26. In a typical installed flange orientation, axis of symmetry 66 represents a vertical axis. However, the flange assembly need not be oriented such that electrode 56 is vertically oriented, and axis of symmetry 66 need therefore not be vertical. As illustrated, an overall width W1 of outermost ring 54 lying on long cross sectional axis $L_a$ of conduit 26 is wider than an overall width W2 of outermost ring 54 on the bottom side of connecting conduit 26 opposite electrode 56, where W2 is the width displaced angularly 90 degrees from width W1. That is, W1 shown in FIGS. 3 and 4 is wider that W2. FIG. 4 shows a cross sectional view of the flange assembly of FIG. 3. It should be noted that dimension W2 is the general, overall width of the bottom portion of outer ring 54, and wherein for the purposes of determining dimension W2, notch 60 is neglected (W2 being therefore the narrowest width of outermost ring 54 taken 90 degrees displaced from W1).

It should be noted that outermost ring 54 may itself comprise multiple rings in some embodiments. For example, outermost ring 54 may be a nickel-containing ring comprised of a plurality of nickel-containing rings of different thicknesses. The nickel may be alloyed with other metals, such as platinum for example.

Figures 5, 6:
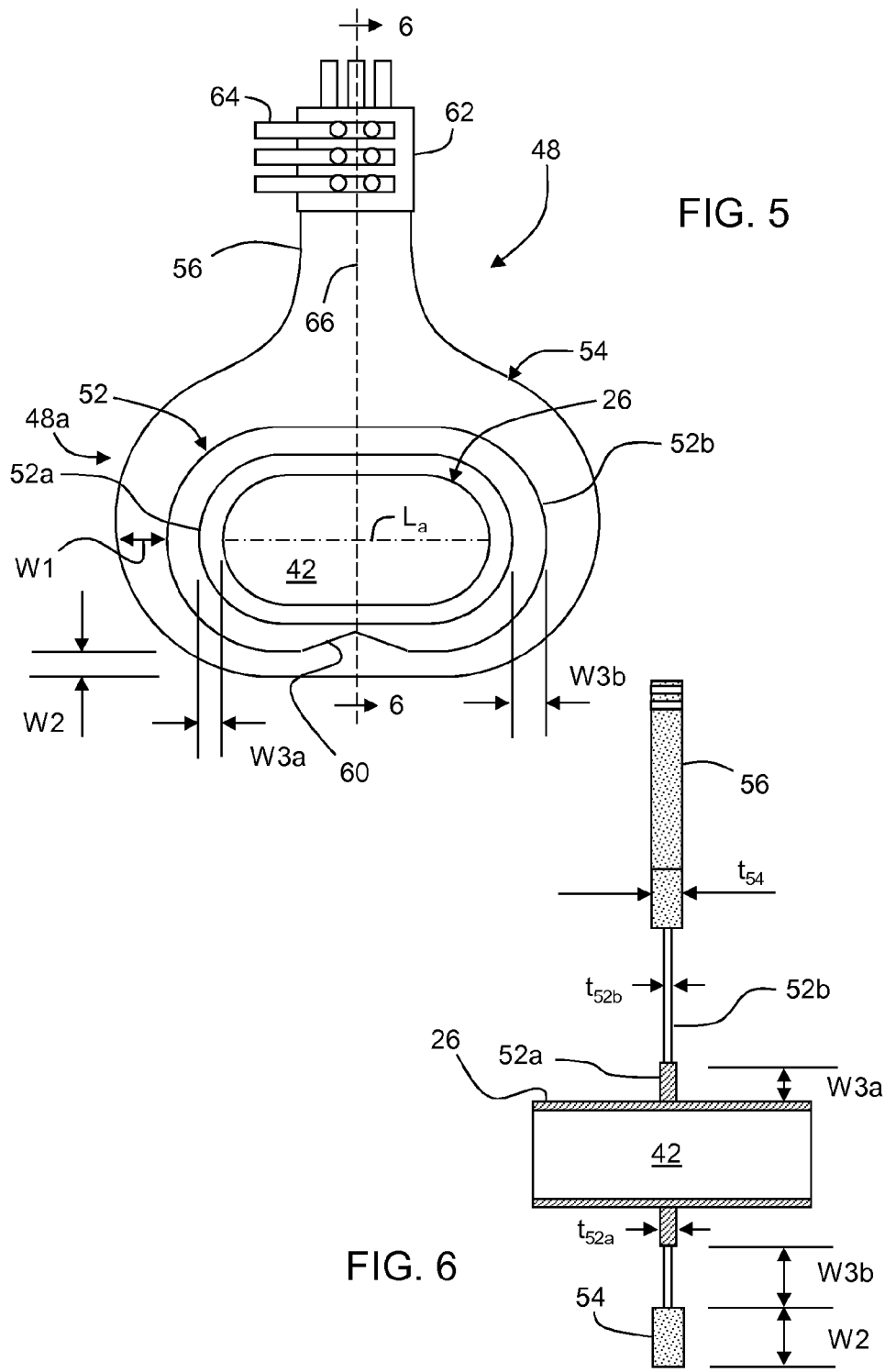
FIG. 5 is a front view of another example flange assembly according to embodiments of the present disclosure.
FIG. 6 is a cross sectional side view of the flange assembly of FIG. 5.

FIGS. 5 and 6 depict another embodiment of flange assembly 48 comprising a nickel-containing outermost ring 54, but where platinum containing ring 52 comprises two platinum-containing rings 52a and 52b disposed about connecting conduit 26, wherein the innermost platinum-containing ring 52a is joined to connecting conduit 26, such as by welding. The width W3 of innermost or first platinum-containing ring 52a along axis of symmetry 66 through electrode 56 is substantially equal in some embodiments. That is, the width W3 of innermost ring 52a does not substantially vary in some embodiments. In other embodiments, the width W3 of innermost ring 52a may be varied. In addition, the width of second, intermediate platinum containing ring 52b may also not substantially vary, with the exception that, as shown in the embodiment of FIG. 5, in the instance where electrode placement is asymmetrical (for example, only a single electrode is utilized), the second, intermediate platinum-containing ring 52b may include notch 60 to aid in making the current density through ring 52b more uniform.

In addition, as shown in FIG. 6, the thickness $t_{52a}$ of innermost platinum-containing ring 52a is preferably greater than thickness $t_{52b}$ of second, intermediate platinum-containing ring 52b. Preferably, thickness $t_{54}$ of outermost ring 54 (e.g. nickel-containing ring 54) is greater than thickness $t_{52a}$ of innermost platinum-containing ring 52a and greater than thickness $t_{52b}$ of second, intermediate platinum containing ring 52b such that $t_{54} > t_{52a} > t_{52b}$.

FIGS. 7 and 8 show yet another embodiment of flange assembly 48 wherein platinum-containing ring 52 comprises three platinum-containing rings 52a, 52b and 52c disposed about connecting conduit 26, wherein the innermost first platinum-containing ring 52a is joined to connecting conduit 26 such as by welding. First or innermost platinum containing ring 52a is connected directly to the wall of conduit 26. A second, intermediate platinum-containing ring 52b is position about innermost platinum-containing ring 52a and joined to a perimeter thereof, and a third, outer platinum-containing ring 52c is disposed about second, intermediate platinum-containing ring 52b and joined to a perimeter thereof. The width W3a of first platinum containing ring 52a may be configured to not vary. Similarly, the width W3b of second, intermediate platinum containing ring 52b may be configured to not vary. The width W3c may also be configured to not substantially vary, excluding the impact of optional notch 60. In the embodiment of FIG. 7, wherein the illustrated flange assembly 48 comprises only a single electrode 56, third, outer platinum-containing ring 52c optionally includes a notch 60 to improve current density uniformity. The overall width (W3=W3a+W3b+W3c) of platinum-containing ring 52 may accordingly be configured to not vary. In addition, the thickness $t_{54}$ of outermost ring 54 is greater that $t_{52a}$ of first or innermost platinum-containing ring 52a, thickness $t_{52a}$ is greater than thickness $t_{52b}$ of first, intermediate platinum-containing ring 52b, and the thickness $t_{52c}$ of second, intermediate platinum-containing ring 52b is greater than the thickness $t_{52c}$ of third, outer platinum-containing ring 52c, such that $t_{54} > t_{52a} > t_{52b} > t_{52c}$. Each individual platinum-containing ring (i.e. 52a, 52b, 52c) may be configured to have a uniform thickness.

It should be apparent based on the teaching of the present disclosure that a plurality of individual platinum-containing rings may be employed to provide an increasing thickness of the platinum-containing portion of the flange body portion 48a as a function of decreasing distance from the wall of connecting conduit 26. However, a common feature of the preceding embodiments is a variable overall width of the outermost (e.g. nickel-containing) ring 54 relative to an angular position around the vessel (e.g. connecting conduit) about which the flange body is disposed. The use of a varying width of the outermost ring or rings as one moves angularly around the flange body provides for a mass gradient that works to make the current density more uniform at the connecting conduit-to-flange joint and within the flange assembly itself.

Figure 9:
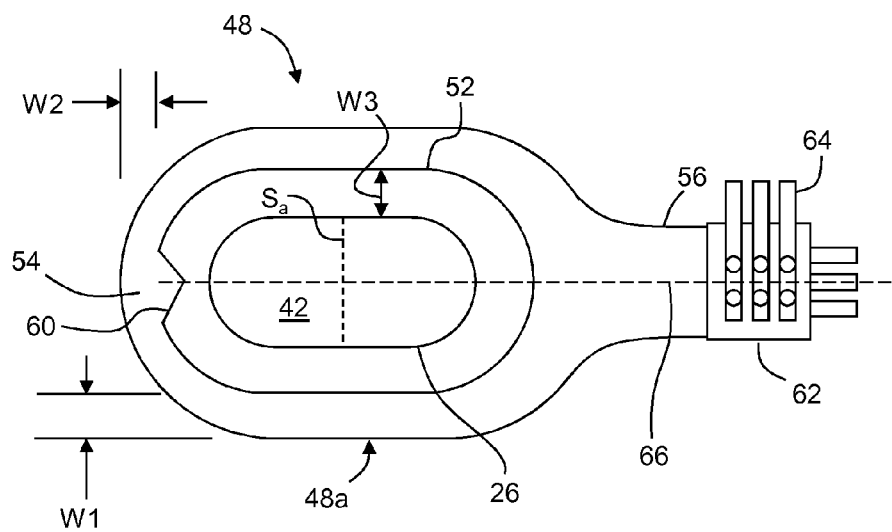
FIG. 9 is a front view of another example flange assembly according to embodiments of the present disclosure.

In another embodiment depicted in FIG. 9, flange assembly 48 is shown with electrode 56 lying along axis of symmetry 66. That is, electrode 56 lies along the long cross sectional axis of conduit 26. Assuming conduit 26 is oriented with short cross sectional axis Sa is vertical, electrode 56 then projects laterally outward from a side of conduit 26. It should be understood that platinum-containing innermost ring 52 may comprise a plurality of platinum-containing rings as described for example, in respect of FIGS. 7 and 8. Notch 60, if present, is positioned opposite electrode 56, on axis of symmetry 66. In the embodiment of FIG. 9, a width W3 of innermost platinum containing ring 52 may be configured to not vary (with the exception that that portion of innermost platinum containing ring 52 comprising notch 60). On the other hand, outermost ring 54 is configured so that the width of the outermost ring varies angularly. Thus, width W1 taken across outermost ring 54 in a direction parallel with short cross sectional axis Sa may be different than a width of outermost ring 54 in a direction perpendicular to short cross sectional axis Sa.

Figure 10:
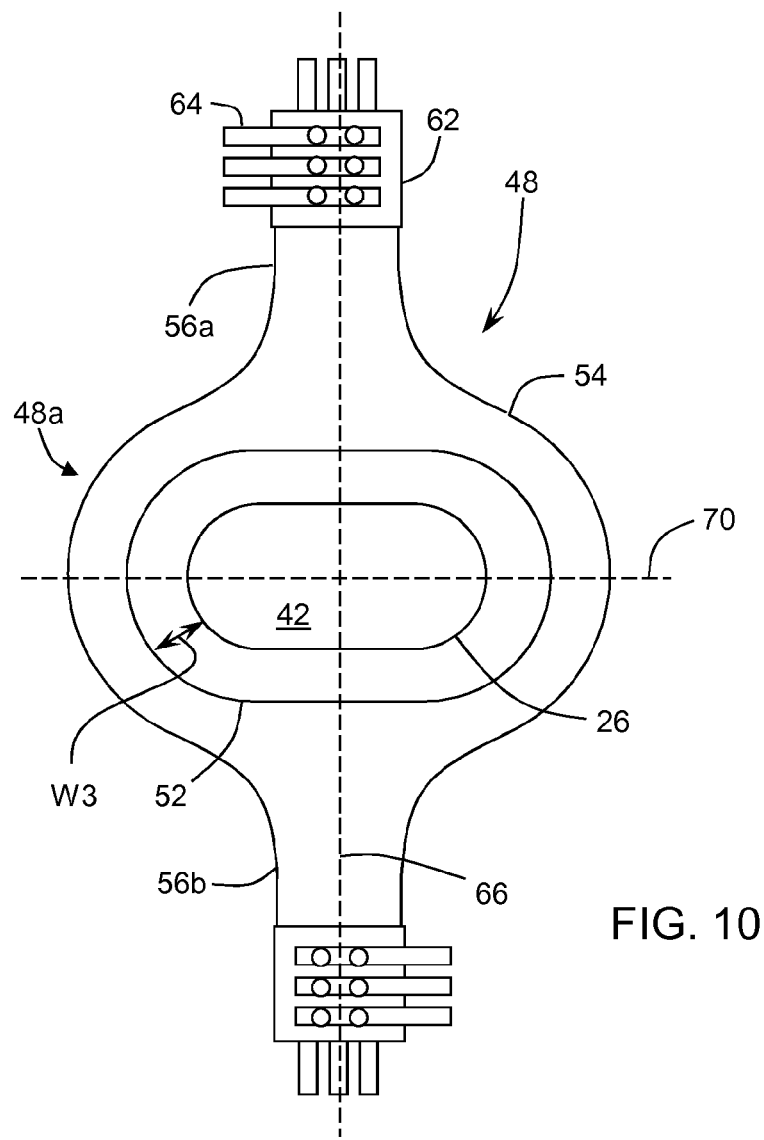
FIG. 10 is a front view of another example flange having two electrodes to supply electrical power to the flange assembly according to embodiments of the present disclosure.

In still another embodiment depicted in FIG. 10, flange assembly 48 comprises a first electrode 56a and a second electrode 56b positioned 180 degrees from first electrode 56a. Because current is symmetrically injected and removed from flange assembly 48 of FIG. 9, platinum-containing ring 52 does not include a notch, as the symmetric placement of the electrodes 56a, 56b provides for more uniform current density around platinum-containing ring 52. It should be understood that a similar configuration exists for the embodiments of FIGS. 5 and 7, where a symmetric placement of multiple electrodes obviates a need for a notch in the platinum containing ring. It should also be observed that the symmetric arrangement of two electrodes in FIG. 10 enables an arrangement of platinum-containing ring 52 midway between the two electrodes. That is, flange assembly 48 of FIG. 10 includes two axes of symmetry 66 and 70, wherein the two axes of symmetry are perpendicular. It should further be understood that additional electrodes may be used. For example, a symmetric arrangement of four electrodes may be employed, where each electrode is positioned along the flange axes of symmetry. For example, the electrodes may be positioned such that two electrode are positioned opposite each other along first axis of symmetry 66 (e.g. 0° and 180°), while the other two electrode are positioned opposite each other along second axis of symmetry 70 (e.g. 90° and 270°). A width W3 of innermost platinum containing ring 52 may be configured to not vary. On the other hand, outermost ring 54 is configured so that the width of the outermost ring varies angularly.

As previously noted, although flange assembly 48 has been described in reference to connecting conduit 26, the flanges described herein may be employed on other electrically conductive vessels having a non-circular cross sectional shape (i.e. oblong shape) where direct resistance heating is applied to heat a material flowing within the vessel.

It should be noted that in each of the preceding embodiments direct active cooling of the flange itself is not performed. For example, there is no active cooling applied about a perimeter of the flange as is used on some conventional electrical flanges. Indeed, unlike some flange assembly designs, the attributes of the flange assemblies described herein may be configured without conduits positioned around a perimeter of the flange assembly 48 by which active cooling can be performed, thereby eliminating the danger associated with cooling liquid leaks in the vicinity of high electrical currents.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for conveying a molten material comprising:
   a vessel having an electrically conductive exterior wall portion, wherein a cross section of the vessel has a long axis La and a short axis Sa;
   a metal flange joined to the vessel about a perimeter of the vessel, the flange comprising a plurality of rings including a platinum-containing inner ring and an outermost ring surrounding the platinum-containing inner ring, and wherein the outermost ring surrounding the platinum-containing inner ring comprises a body portion and an electrode portion extending therefrom; and
   wherein a width of the body portion of the outermost ring along the long axis La of the vessel is different than a width of the outermost ring along the short axis Sa of the vessel and wherein the platinum-containing inner ring comprises a notch.

2. The apparatus according to claim 1, wherein the outermost ring comprises nickel.

3. The apparatus according to claim 1, wherein the metal flange comprises a single axis of symmetry parallel with one of the short axis Sa or the long axis La.

4. The apparatus according to claim 1, wherein a width of the platinum-containing inner ring, excluding the notch, does not substantially vary.

5. The apparatus according to claim 1, wherein the platinum-containing inner ring comprises a plurality of platinum-containing rings, and a thickness of at least one of the plurality of platinum-containing rings is different that a thickness of another of the platinum-containing rings.

6. The apparatus according to claim 5, wherein the platinum-containing inner ring comprises a plurality of platinum-containing rings, and an outermost platinum-containing ring of the plurality of platinum-containing rings comprises the notch.

7. The apparatus according to claim 1, wherein the outermost ring does not include a cooling member configured to carry a cooling fluid within a passage of the cooling member.

8. An apparatus for forming a glass sheet comprising:
   a vessel having an electrically conductive exterior wall portion with an oblong cross sectional shape;
   a metal flange comprising a plurality of rings including at least:
      a first ring having a first composition comprising platinum and joined to the vessel about a perimeter of the vessel, the first ring having an outer perimeter with an oblong cross sectional shape and a notch, the notch increasing the uniformity of a current density around the first ring; and
      a second ring disposed about a perimeter of the first ring, the second ring having a second composition different from the first composition and comprising an electrode portion extending therefrom; and
   wherein a width of the second ring varies as a function of angular position relative to the vessel.

9. The apparatus according to claim 8, wherein the apparatus further comprises a forming body comprising converging forming surfaces.

10. The apparatus according to claim 8, wherein a width of the first ring, excluding the notch, does not substantially vary.

11. The apparatus according to claim 8, wherein the first ring comprises a plurality of platinum-comprising rings, and a thickness of at least one of the plurality of platinum-comprising rings is different that a thickness of another of the plurality of platinum-comprising rings.

12. The apparatus according to claim 8, wherein the first ring comprises a plurality of platinum-comprising rings, and an outermost platinum-comprising ring of the plurality of platinum-comprising rings comprises the notch.

13. The apparatus according to claim 8, wherein the second ring does not include a cooling member configured to carry a cooling fluid within a passage of the cooling member.

* * * * *